(12) United States Patent
Berman

(10) Patent No.: US 6,558,644 B1
(45) Date of Patent: May 6, 2003

(54) PROCESS FOR PREPARING ACTIVATED CARBON FROM URBAN WASTE

(75) Inventor: Yaakov Berman, Tel Aviv (IL)

(73) Assignee: Maavar K.B. Recycling and Production of Carbon Ltd., TelAviv-Yafo (IL)

(*) Notice: Subject to any disclaimer, the term of this patent is extended or adjusted under 35 U.S.C. 154(b) by 0 days.

(21) Appl. No.: 09/720,692
(22) PCT Filed: Jun. 28, 1999
(86) PCT No.: PCT/IL99/00356
  § 371 (c)(1),
  (2), (4) Date: Mar. 5, 2001
(87) PCT Pub. No.: WO00/00429
  PCT Pub. Date: Jan. 6, 2000

(30) Foreign Application Priority Data

Jun. 29, 1998 (IL) ................................................. 125137

(51) Int. Cl.$^7$ ............................... C01B 31/00; B09B 3/00
(52) U.S. Cl. ................................ 423/445 R; 423/447.4; 23/314; 502/437
(58) Field of Search ........................... 423/445 R, 447.6, 423/481, 488, 447.4, 449.1, 449.3; 201/20, 26, 21, 36; 502/418, 423, 437; 588/213, 228; 585/240, 241, 242; 23/314; 241/23, 24.1; 209/11

(56) References Cited

U.S. PATENT DOCUMENTS

| | | | |
|---|---|---|---|
| 4,077,847 A | 3/1978 | Choi | 201/21 |
| 4,225,463 A * | 9/1980 | Unger et al. | 210/656 |
| 5,194,069 A | 3/1993 | Someus | 44/500 |
| 5,242,879 A | 9/1993 | Abe et al. | 502/180 |
| 5,254,265 A | 10/1993 | Chung et al. | 210/774 |
| 5,338,462 A | 8/1994 | Abe et al. | 210/757 |
| 5,589,599 A * | 12/1996 | McMullen et al. | 585/240 |
| 6,030,922 A * | 2/2000 | Khalili et al. | 502/423 |
| 6,057,262 A * | 5/2000 | Derbyshire et al. | 502/423 |

FOREIGN PATENT DOCUMENTS

| | | |
|---|---|---|
| DE | 2660429 | 11/1977 |
| EP | 0069159 | 1/1983 |
| EP | 0433547 | 7/1993 |
| GB | 1385453 | 2/1975 |

OTHER PUBLICATIONS

Kartel et al, "Synthetic spherically granulated carbon sorbent– for sorption of substances from solns. and biological liqs., is obtd. by carbonising porous organic polymers, activation and modifying", SU 18361383 A3, Aug. 1993, Derwent Information, Abstract.*

Mitsubishi Petroch KK, "Preparation of porous carbonaceous particles for filtration and adsorption–simultaneously granulating, carbonising and increasing the porosity.", JA 0020395, Feb. 1977, Abstract.*

Chemical Abstracts, vol. 121, No. 6, Aug. 8, 1994, (Abstract No. 60581s) "Preparation of Activated Carbon from Wastes" by bota et al (XP000665343); Abstract & Kem. Kozl., vol. 76, No. 1–2, 1993, pp. 139–146, Budapest.

* cited by examiner

Primary Examiner—Steven Bos
Assistant Examiner—Anthony Kuhar
(74) Attorney, Agent, or Firm—Baker Botts, LLP

(57) ABSTRACT

A process for the preparation of active carbon from urban waste. The waste is first stored to remove foreign materials and the size of the waste particles is reduced. The waste is dried under anaerobic conditions at a temperature range of 100° C.–150° C. and partially pyrolysed at a temperature of about 140° C.–400° C. The obtained product is granulated and the granules are carbonized under anaerobic conditions at a temperature of about 120° C.–500° C. The carbonized granules are activated in the presence of steam and combustion gases at 750° C.–900° C. Finally, the activated granules are purified by rinsing in an aqueous HCl solution, and subsequently drying the activated carbon.

17 Claims, 1 Drawing Sheet

PROCESS FOR PREPARING ACTIVATED CARBON FROM URBAN WASTE

The present invention relates to an improved process for preparing activated carbon from urban waste, and to activated carbon prepared thereby.

BACKGROUND OF THE INVENTION

The increasing amount of urban waste produced daily has brought forth the need to find improved solutions to the conventional waste disposal methods of landfilling and incineration.

A large scale improved solution currently applied is the recycling for re-use of certain components of the waste, such as metals, glass and plastics. However, this type of recycling does not provide a solution for a major component of the waste, viz., waste from botanical sources (wood scrap, fruits, vegetables, food, vegetation etc.) and paper product waste, which together with plastic waste constitute the organic fraction of urban waste. An effective solution for the recycling of the organic fraction of urban waste is the use of said fraction as raw material in conversion processes which convert organic waste into economically valuable products. Such a process is a pyrolysis which thermally converts organic waste to charcoal, as a primary product, and to other by-products known as pyrolytic gases and liquids, which have a low commercial value.

U.S. Pat. No. 4,077,847 discloses a solid waste disposal system which sorts urban waste and produces via flash pyrolysis char and pyrolytic oils from the organic fraction of the waste. EP 69,159 discloses a pyrolysis process for organic waste which produces charcoal and pyrolytic products, which are recycled for use in the pyrolytic process. The charcoal produced in pyrolytic processes can be used as raw material for preparing active carbon. The charcoal produced in the aforementioned processes, however, has a high ash content, and therefore the active carbon produced from such charcoal is characteristically soft and brittle and of poor quality.

Among the characteristics which determine the quality of active carbon are the ash content, the pore volume and the hardness. Active carbon which is hard, contains a low percentage of ash and has high pore volume is considered to be of high quality. The ash content of the charcoal produced by pyrolysis directly influences the quality of the active carbon prepared from the charcoal. Charcoal containing 10–20% ash is considered to be excellent quality charcoal. Thus, the active carbon prepared from this charcoal is also of prime quality.

It is a purpose of the present invention to provide an improved pyrolytic process of urban waste.

It is a further purpose of this invention to introduce an improved process for the preparation of charcoal of low ash content, from urban waste.

It is a further purpose of this invention to provide an improved process for the preparation of active carbon.

It is still a further purpose of this invention to provide an improved process for the preparation of granulated active carbon of low ash content, from urban waste.

It is yet another purpose of this invention to provide an improved process for the preparation of granulated active carbon of high quality, from urban waste.

Other objects of the invention will become apparent as the description proceeds.

SUMMARY OF THE INVENTION

According to the present invention the organic fraction of urban waste is converted to active carbon via an improved pyrolytic process. The active carbon produced has a low ash content, high pore volume and hardness. Hence, the active carbon of the present invention possesses superior characteristics.

In one aspect, the invention is directed to a process for the preparation of active carbon from urban waste comprising the steps of:

a) Sorting the waste to remove foreign materials;

b) Reducing the size of the waste particles;

c) Drying the waste under anaerobic conditions at a temperature comprised between about 100° C.–150° C.;

d) Pyrolysing the waste of step (c) at a temperature of about 140° C. and above;

e) Granulating the product obtained in step (d) above;

f) Carbonizing the granules obtained in step (e) above under anaerobic conditions at a temperature of about 110° C. and above;

g) Activating the carbonized granules of step (f) above in the presence of steam and combustion gases at about 750° C.–900° C.; and h) Purifying the activated granules of step (g) above by rinsing in an aqueous acidic solution, and subsequently drying the activated carbon until the water content of the particles is in the range of 4%–8%.

Unless otherwise specifically indicated, all percentages given herein are by weight, and all ratios between various process components are also by weight.

The urban waste referred to herein includes various types of waste produced in the urban environment. For the purpose of this invention urban waste is defined as waste which includes domestic waste and commercial waste but does not include industrial waste. In this context, domestic waste includes waste produced in an average normal household which comprises food waste, paper products and packaging, plastic products, wood, glass and metal. Commercial waste is the waste produced by the commercial sector. Much of the commercial waste is generated by food establishments, markets, grocery stores and the like.

By "foreign materials" it is meant to indicate non-pyrolyzable materials, such as metal and glass, that may interfere with the process.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
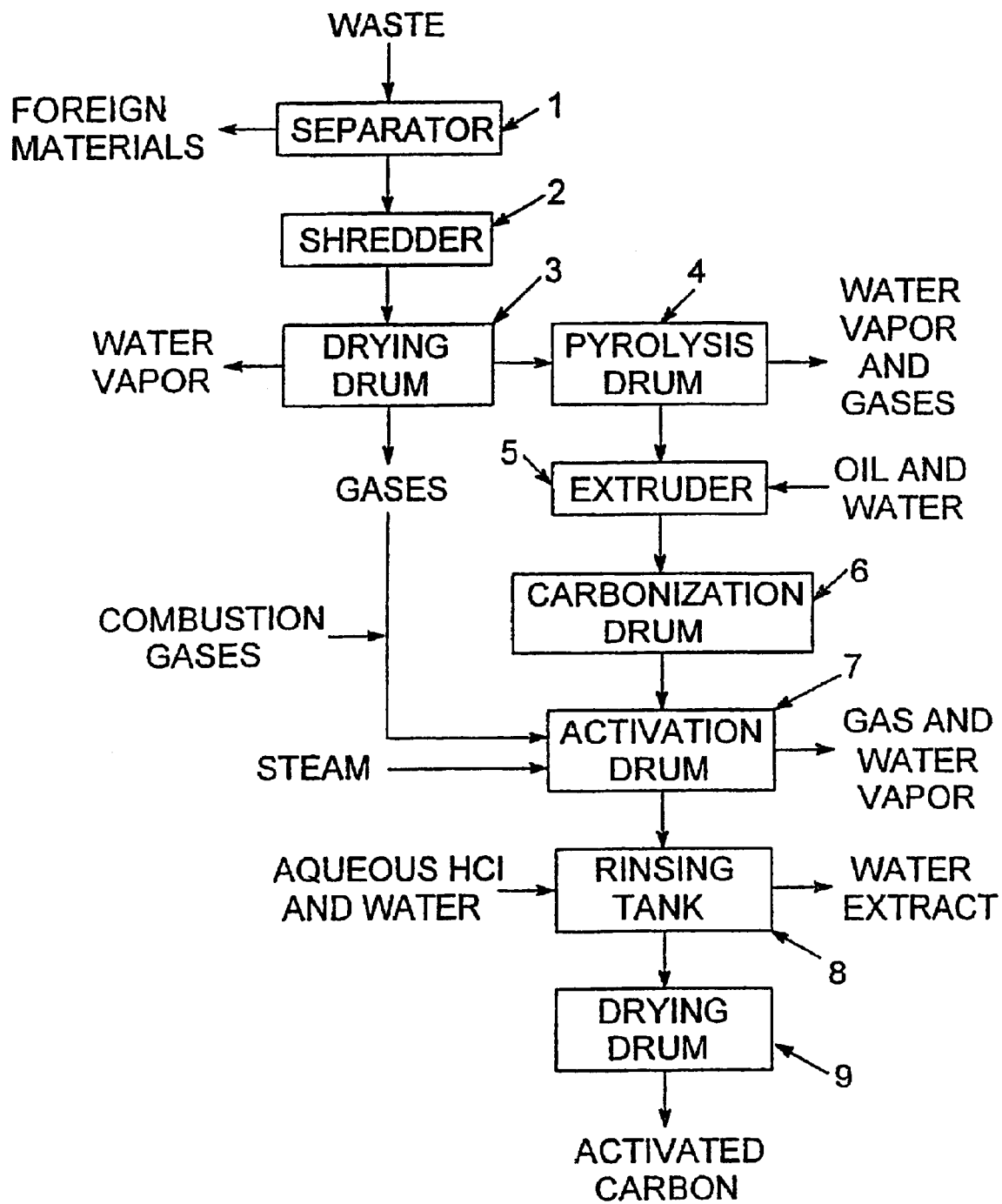
FIG. 1 is a block diagram of the process for preparing activated carbon from urban waste.

A process according to our preferred embodiment of the invention will now be described in general terms, it being understood that the various conditions described are provided only for the purpose of illustration and are not intended to be limitative.

In the initial stage the waste is sorted for the removal of foreign materials. The waste is then shredded to particle size of about 2 cm×2 cm×2 cm, and then dried at a temperature of about 110° C. The dried particulate waste is then transferred to the pyrolysis vessel wherein the pyrolysis is a two stage process conducted at a temperature, preferably, in the range of 140° C. to 500° C., in which primary pyrolysis takes place at about 160° C. and in the second stage the temperature reaches 390° C. The pyrolysis stage takes about 2 hours. Optionally, matter made of polymeric materials, typically, plastics and rubbers, are removed prior to and/or subsequent to any one of the pyrolysis stages. The charcoal produced in the pyrolysis is crushed to a mean particle size up to about 0.01 mm. This charcoal produced in the pyrolysis stage has an ash content of 9–20%. This charcoal is granulated in an extruder with a charcoal:water:oil ratio of about 1:0.7:0.15. The subsequent carbonization is carried out at a temperature, preferably, in the range of 110° C. to 600° C. The granulated carbon is then carbonized at about 180° C. under anaerobic conditions. The subsequent activation is carried out at about 790° C. in the presence of steam and combustion gases. The combustion gases used in this stage are mixed with gases from the drying process.

The final purifying of the activated carbon is done by rinsing with an aqueous acidic solution, preferably, 5%–20% HCl solution, until the ash content is 2%–5% followed by washing in water until the water extracts have a pH of 3.5–5. The rinsed activated carbon is finally dried at about 100° C. to a final water content in the range of 4%–8%.

The activated carbon obtained by the process of the present invention has an ash content of 2%–5%, a mean pore volume in the range of 0.95–1.2 ml/g as determined according to Kuleshkin, D. A. and Michaelova, C. C., "Activated Carbon", Leningrad Chem., 1972, and a hardness in the range 85–95 as determined according to the method of Russian standard GOST 16188-70

DETAILED DESCRIPTION OF PREFERRED EMBODIMENTS OF THE INVENTION

The following example is illustrative of a preferred embodiment of the invention, with reference to FIG. 1, which is a block diagram of the process. The following example is not to be construed as limiting, it being understood that the skilled person may carry out many obvious variations to the process.

EXAMPLE 1

1100 Kg of urban waste were sorted to remove foreign material (FIG. 1, stage 1). The remaining waste was then shredded to pieces approximately 2 cm×2 cm×2 cm (FIG. 1, stage 2). The shredded waste was then introduced into a rotating drum which was heated to 110° C. through an external heating jacket under anaerobic conditions for 90 minutes (FIG. 1, stage 3). The partially dried waste was pyrolized initially at about 160° C. and then at about 390° C. for about 2 hours (FIG. 1, stage 4). The pyrolysis product, charcoal, weighed 100 Kg and was loaded into an extruder (model: LUK 2.5 K, manufactured by WERNER & PFLEIDERER, Germany) together with 70 Kg of oil and 14 liters of water (FIG. 1, stage 5). 184 Kg of granulated carbon having a mean particle diameter of 1.2 mm were obtained. These granules were then carbonized at about 180° C. for about 50–75 minutes, under anaerobic conditions to yield 110 Kg of dried particles (FIG. 1, stage 6). The activation was conducted at about 790° C. in the presence of steam and combustion gases for about 80–110 minutes. The combustion gases were mixed with gases emitted during the initial drying stage (FIG. 1, stage 7). All heating stages were carried out in the same rotating drum. 70 Kg of activated particles were obtained. The activated carbon granules were then washed in an aqueous 10% HCl solution until the ash content was 2.1%–4.5% (FIG. 1, stage 8). The granules were then rinsed with water until the water extract had a pH of 3.5–5 (FIG. 1, stage 8). Finally the activated carbon was dried at about 110° C. until the water content of the particles was 4%–8% (FIG. 1, stage 9). 55 Kg of activated carbon were produced possessing the following characteristics:

TABLE I

| Type of Analysis | Test Result |
| --- | --- |
| Moisture, Wt. % | 4.0 |
| Ash, Wt. % | 2.2 |
| Acid Sol. Ash, Wt. % | 0.55 |
| pH, water extract, | 3.5 |
| Chlorides, as is, ppm | 601 |
| Phosphate, as is, Wt. % | <0.01 |
| Acid Sol. Iron, ppm | 273 |
| Molasses Number, | 142 |
| Phenol Value, g/l | 1.7 |
| Iodine Number, mg/g | 1220 |
| Surface area, sq.m/g | 1486 |
| Total Pore Volume, ml/g | 1.18 |
| Dust, Wt. % | 0.09 |
| Average Particle Dia., mm | 1.0 |
| Average Particle Length, mm | 3.5 |

All the above descriptions of preferred embodiments and examples of the invention have been provided for the purpose of illustration and are not intended to limit the invention in any way.

What is claimed is:

1. A process for the preparation of active carbon from urban waste comprising the following steps:
   a) Sorting the waste to remove foreign materials;
   b) Shredding the waste;
   c) Drying the shredded waste of step (b) under anaerobic conditions at a temperature of between about 100° C. and 150° C.;
   d) Pyrolysing the waste of step (c) at a temperature of about 140° C. and above;
   e) Granulating the product obtained in step (d);
   f) Carbonizing the granules obtained in step (e) under anaerobic conditions at a temperature of about 110° C. and above;
   g) Activating the carbonized granules of step (f) in the presence of steam and combustion gases at 750° C.–900° C.; and
   h) Purifying the activated granules of step (g) by rinsing in an aqueous acidic solution, and subsequently drying the rinsed activated granules to form active carbon.

2. A process according to claim 1, wherein the waste is dried at a temperature of about 110° C.

3. A process according to claim 1, wherein the pyrolysis is a two stage process in which primary pyrolysis takes place at about 160° C. and in the second stage the temperature reaches up to 390° C. for about 2 hours.

4. A process according to claim 1, wherein the product produced in the pyrolysis of step (d) is crushed to a mean particle size of up to about 0.01 mm.

5. A process, according to claim 1, wherein the product produced in the pyrolysis of step (d) has an ash content in the range of 9–20%.

6. A process according to claim 1, wherein granulation is carried out in an extruder with a charcoal:water:oil ratio of about 1:0.7:0.15.

7. A process according to claim 1, wherein carbonization is carried out at about 180° C. under anaerobic conditions.

8. A process according to claim 1, wherein activation is carried out at about 790° C. in the presence of steam and combustion gases for about 80–100 minutes.

9. A process according to claim 8, wherein the combustion gases are mixed with gases from the drying of step (c).

10. A process according to claim 1, wherein the rinsed activated granules of step (h) are dried until the water content is in the range 4%–8%.

11. A process according to claim 1, wherein the rinsing aqueous acidic solution is a 5%–20% HCl solution in water.

12. A process according to claim 1, wherein the rinsed activated granules are dried at about 100° C.

13. A process according to claim 1, wherein the pyrolysis is conducted in a temperature range of 140° C. to 500° C.

14. A process according to claim 1, wherein the carbonization is conducted in a temperature range of 110° C. to 600° C.

15. A process according to claim 1 wherein polymeric materials are removed following the drying of step (c).

16. A process according to claim 3 wherein polymeric, materials are removed following the primary pyrolysis and/or the second stage of pyrolysis.

17. A process according to claim 1, wherein the active carbon has an ash content of 2% to 5%, a mean pore volume in the range of 0.95–1.2 ml/g, and a hardness in the range of 85–95, wherein the hardness is determined according to the method of Russian Standard GOST 16188-70.

* * * * *